(12) United States Patent
Kim (10) Patent No.: US 10,856,303 B2
(45) Date of Patent: Dec. 1, 2020

(54) METHOD FOR PERFORMING MEASUREMENT AND DEVICE SUPPORTING THE SAME

(71) Applicant: LG ELECTRONICS INC., Seoul (KR)

(72) Inventor: Sangwon Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 16/153,527

(22) Filed: Oct. 5, 2018

(65) Prior Publication Data
US 2019/0110299 A1    Apr. 11, 2019

Related U.S. Application Data

(60) Provisional application No. 62/568,802, filed on Oct. 6, 2017.

(51) Int. Cl.
| | |
|---|---|
| H04L 5/00 | (2006.01) |
| H04W 72/08 | (2009.01) |
| H04W 72/04 | (2009.01) |
| H04L 27/26 | (2006.01) |

(52) U.S. Cl.
CPC ........... *H04W 72/085* (2013.01); *H04L 5/005* (2013.01); *H04L 5/0051* (2013.01); *H04L 5/0094* (2013.01); *H04L 27/261* (2013.01); *H04W 72/0446* (2013.01); *H04L 27/2647* (2013.01)

(58) Field of Classification Search
CPC ..... H04L 5/0094; H04L 5/005; H04L 27/261; H04L 5/0051; H04L 27/2647; H04W 72/085; H04W 72/0446
See application file for complete search history.

(56) References Cited

U.S. PATENT DOCUMENTS

| | | | | |
|---|---|---|---|---|
| 10,368,260 | B2 * | 7/2019 | Zhou | H04L 5/0057 |
| 2011/0301731 | A1 * | 12/2011 | Okimoto | H04R 3/00 700/94 |
| 2012/0218139 | A1 * | 8/2012 | Suzuki | G01S 3/74 342/189 |
| 2012/0264476 | A1 * | 10/2012 | Kleinhenz | H04B 17/26 455/517 |
| 2014/0112184 | A1 * | 4/2014 | Chai | H04L 1/0077 370/252 |
| 2016/0149679 | A1 * | 5/2016 | Frenne | H04L 5/005 370/329 |
| 2016/0381610 | A1 * | 12/2016 | Pu | H04W 36/0055 455/436 |
| 2017/0208494 | A1 * | 7/2017 | Moon | H04L 5/0048 |
| 2017/0324459 | A1 * | 11/2017 | Koskela | H04B 7/0617 |

* cited by examiner

*Primary Examiner* — Lan-Huong Truong
(74) *Attorney, Agent, or Firm* — Lee, Hong, Degerman, Kang & Waimey (57) ABSTRACT

Provided are a method for performing measurement and a device supporting the method. According to an embodiment of the present invention, a method comprises: receiving a reference signal (RS); receiving a measurement configuration including a set of filter coefficients from a network, wherein each filter coefficient in the set of filter coefficients is configured per periodicity of the RS; performing a measurement based on the RS; selecting a filter coefficient in the set of filter coefficients based on the periodicity of the RS; and reporting a result of the measurement filtered based on the selected filter coefficient.

10 Claims, 9 Drawing Sheets

METHOD FOR PERFORMING MEASUREMENT AND DEVICE SUPPORTING THE SAME

CROSS-REFERENCE TO RELATED APPLICATIONS

Pursuant to 35 U.S.C. § 119(e), this application claims the benefit of U.S. Provisional Patent Application No. 62/568,802, filed on Oct. 6, 2017, the contents of which are hereby incorporated by reference herein in its entirety.

BACKGROUND OF THE INVENTION

Field of the Invention

The present invention relates to a wireless communication system, and more particularly, to a method in which reporting result of measurement precisely, and a device supporting the same.

Related Art

Efforts have been made to develop an improved 5th-generation (5G) communication system or a pre-5G communication system in order to satisfy a growing demand on radio data traffic after commercialization of a 4th-generation (4G) communication system. A standardization act for a 5G mobile communication standard work has been formally started in 3GPP, and there is ongoing discussion in a standardization working group under a tentative name of a new radio access (NR).

Meanwhile, an upper layer protocol defines a protocol state to consistently manage an operational state of a user equipment (UE), and indicates a function and procedure of the UE in detail. In the discussion on the NR standardization, an RRC state is discussed such that an RRC_CONNECTED state and an RRC_IDLE state are basically defined, and an RRC_INACTIVE state is additionally introduced.

Meanwhile, In NR, Reference Signal (=RS) periodicity can be quite varied as opposed to LTE. Thus, it is needed to configure different filter coefficient depending on the RS periodicity.

SUMMARY OF THE INVENTION

According to a prior art, filter coefficient is fixed, so that the UE cannot adjust filter coefficient based on varied RS periodicity.

According to one embodiment of the present invention, a method for a user equipment (UE) in wireless communication system is provided. The method may comprise: receiving a reference signal (RS); receiving a measurement configuration including a set of filter coefficients from a network, wherein each filter coefficient in the set of filter coefficients is configured per periodicity of the RS; performing a measurement based on the RS; selecting a filter coefficient in the set of filter coefficients based on the periodicity of the RS; and reporting a result of the measurement filtered based on the selected filter coefficient.

The filter coefficient may be further configured per a type of the RS in the set of the filter coefficients, and wherein the selecting the filter coefficient is performed based on the type of the RS.

The type of the RS may be at least one of synchronization signal (SS)-block or channel state information (CSI)-RS.

The set of the filter coefficients may be configured per cell quality.

The reporting the result of the measurement may be performed, if the result satisfies a reporting condition.

The filtering the result of the measurement is filtering on radio interface layer 3 of the UE.

According to another embodiment of the present invention, a user equipment (UE) in a wireless communication system is provided. The UE may comprise: a transceiver for transmitting or receiving a radio signal; and a processor coupled to the transceiver, wherein the processor is configured to: control the transceiver to receive a reference signal (RS); control the transceiver to receive a measurement configuration including a set of filter coefficients from a network, wherein each filter coefficient in the set of filter coefficients is configured per periodicity of the RS; perform a measurement by using the RS; select a filter coefficient in the set of filter coefficients based on the periodicity of the RS; and control the transceiver to report a result of the measurement filtered based on the selected filter coefficient.

The filter coefficient may be further configured per a type of the RS in the set of the filter coefficients, and wherein the processor further configured to select the filter coefficient based on the type of the RS.

The type of the RS may be at least one of synchronization signal (SS)-block or channel state information (CSI)-RS.

The set of the filter coefficients may be configured per cell quality.

The processor is further configured to: control the transceiver to report the result of the measurement, if the result satisfies a reporting condition.

The filtering the result of the measurement may be filtering on radio interface layer 3 of the UE.

According to another embodiment of the present invention, a base station (BS) in a wireless communication system is provided. The BS may comprise: a transceiver for transmitting or receiving a radio signal; and a processor coupled to the transceiver, wherein the processor is configured to: control the transceiver to receive a reference signal (RS); control the transceiver to transmit a measurement configuration including a set of filter coefficients to a user equipment (UE), wherein each filter coefficient in the set of filter coefficients is configured per periodicity of the RS; and control the transceiver to receive a result of a measurement filtered by a filter coefficient selected based on the periodicity of the RS.

The type of the RS may be at least one of synchronization signal (SS)-block or channel state information (CSI)-RS.

The set of the filter coefficients may be configured per cell quality.

DESCRIPTION OF EXEMPLARY EMBODIMENTS

The technical features described below may be used by a communication standard by the 3rd generation partnership project (3GPP) standardization organization, a communication standard by the institute of electrical and electronics engineers (IEEE), etc. For example, the communication standards by the 3GPP standardization organization include long-term evolution (LTE) and/or evolution of LTE systems. The evolution of LTE systems includes LTE-advanced (LTE-A), LTE-A Pro, and/or 5G new radio (NR). The communication standard by the IEEE standardization organization includes a wireless local area network (WLAN) system such as IEEE 802.11a/b/g/n/ac/ax. The above system uses various multiple access technologies such as orthogonal frequency division multiple access (OFDMA) and/or single carrier frequency division multiple access (SC-FDMA) for downlink (DL) and/or uplink (DL). For example, only OFDMA may be used for DL and only SC-FDMA may be used for UL. Alternatively, OFDMA and SC-FDMA may be used for DL and/or UL.

Figure 1:
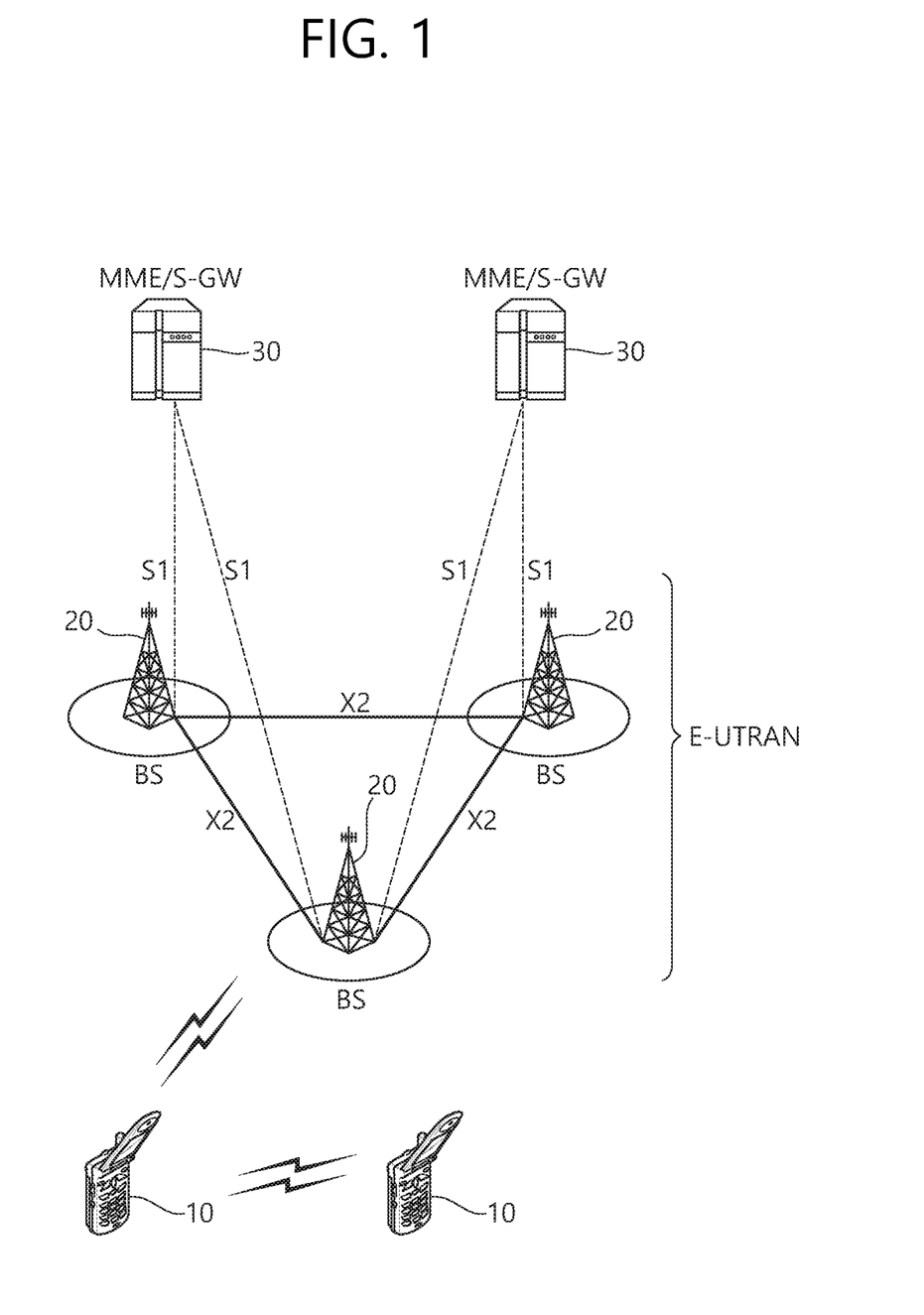
FIG. 1 shows an example of a wireless communication system to which technical features of the present invention can be applied.

FIG. 1 shows an example of a wireless communication system to which technical features of the present invention can be applied. Specifically, FIG. 1 shows a system architecture based on an evolved-UMTS terrestrial radio access network (E-UTRAN). The aforementioned LTE is a part of an evolved-UTMS (e-UMTS) using the E-UTRAN.

Referring to FIG. 1, the wireless communication system includes one or more user equipment (UE; 10), an E-UTRAN and an evolved packet core (EPC). The UE 10 refers to a communication equipment carried by a user. The UE 10 may be fixed or mobile. The UE 10 may be referred to as another terminology, such as a mobile station (MS), a user terminal (UT), a subscriber station (SS), a wireless device, etc.

The E-UTRAN consists of one or more base station (BS) 20. The BS 20 provides the E-UTRA user plane and control plane protocol terminations towards the UE 10. The BS 20 is generally a fixed station that communicates with the UE 10. The BS 20 hosts the functions, such as inter-cell radio resource management (MME), radio bearer (RB) control, connection mobility control, radio admission control, measurement configuration/provision, dynamic resource allocation (scheduler), etc. The BS may be referred to as another terminology, such as an evolved NodeB (eNB), a base transceiver system (BTS), an access point (AP), etc.

A downlink (DL) denotes communication from the BS 20 to the UE 10. An uplink (UL) denotes communication from the UE 10 to the BS 20. A sidelink (SL) denotes communication between the UEs 10. In the DL, a transmitter may be a part of the BS 20, and a receiver may be a part of the UE 10. In the UL, the transmitter may be a part of the UE 10, and the receiver may be a part of the BS 20. In the SL, the transmitter and receiver may be a part of the UE 10.

The EPC includes a mobility management entity (MME), a serving gateway (S-GW) and a packet data network (PDN) gateway (P-GW). The MME hosts the functions, such as non-access stratum (NAS) security, idle state mobility handling, evolved packet system (EPS) bearer control, etc. The S-GW hosts the functions, such as mobility anchoring, etc. The S-GW is a gateway having an E-UTRAN as an endpoint. For convenience, MME/S-GW 30 will be referred to herein simply as a "gateway," but it is understood that this entity includes both the MME and S-GW. The P-GW hosts the functions, such as UE Internet protocol (IP) address allocation, packet filtering, etc. The P-GW is a gateway having a PDN as an endpoint. The P-GW is connected to an external network.

The UE 10 is connected to the BS 20 by means of the Uu interface. The UEs 10 are interconnected with each other by means of the PC5 interface. The BSs 20 are interconnected with each other by means of the X2 interface. The BSs 20 are also connected by means of the S1 interface to the EPC, more specifically to the MME by means of the S1-MME interface and to the S-GW by means of the S1-U interface. The S1 interface supports a many-to-many relation between MMEs/S-GWs and BSs.

Figure 2:
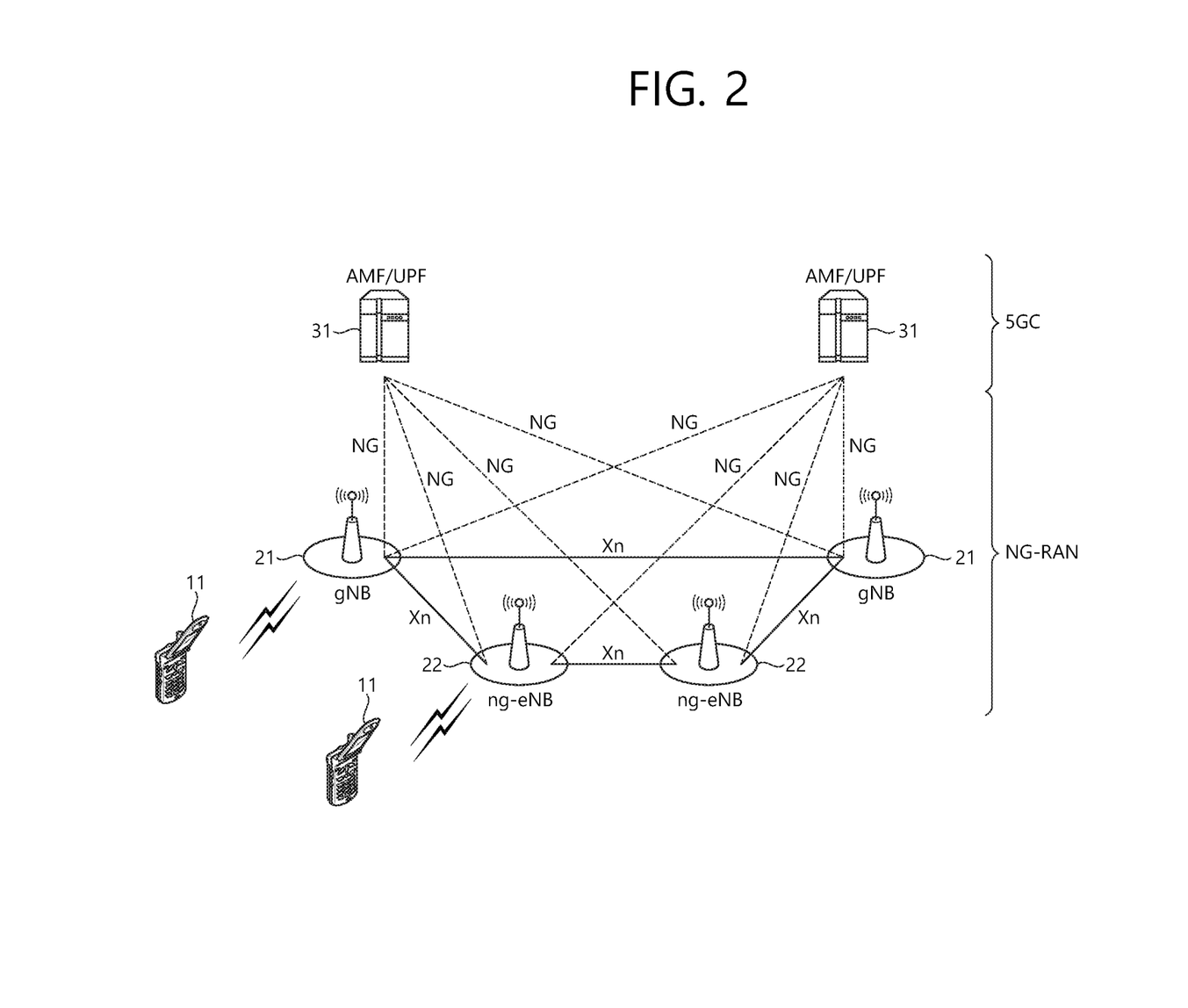
FIG. 2 shows another example of a wireless communication system to which technical features of the present invention can be applied.

FIG. 2 shows another example of a wireless communication system to which technical features of the present invention can be applied. Specifically, FIG. 2 shows a system architecture based on a 5G new radio access technology (NR) system. The entity used in the 5G NR system (hereinafter, simply referred to as "NR") may absorb some or all of the functions of the entities introduced in FIG. 1 (e.g. eNB, MME, S-GW). The entity used in the NR system may be identified by the name "NG" for distinction from the LTE/LTE-A.

Referring to FIG. 2, the wireless communication system includes one or more UE 11, a next-generation RAN (NG-RAN) and a 5th generation core network (5GC). The NG-RAN consists of at least one NG-RAN node. The NG-RAN node is an entity corresponding to the BS 10 shown in FIG. 1. The NG-RAN node consists of at least one gNB 21 and/or at least one ng-eNB 22. The gNB 21 provides NR user plane and control plane protocol terminations towards the UE 11. The ng-eNB 22 provides E-UTRA user plane and control plane protocol terminations towards the UE 11.

The 5GC includes an access and mobility management function (AMF), a user plane function (UPF) and a session management function (SMF). The AMF hosts the functions, such as NAS security, idle state mobility handling, etc. The AMF is an entity including the functions of the conventional MME. The UPF hosts the functions, such as mobility anchoring, protocol data unit (PDU) handling. The UPF an entity including the functions of the conventional S-GW. The SMF hosts the functions, such as UE IP address allocation, PDU session control.

The gNBs and ng-eNBs are interconnected with each other by means of the Xn interface. The gNBs and ng-eNBs are also connected by means of the NG interfaces to the 5GC, more specifically to the AMF by means of the NG-C interface and to the UPF by means of the NG-U interface.

A protocol structure between network entities described above is described. On the system of FIG. 1 and/or FIG. 2, layers of a radio interface protocol between the UE and the network (e.g. NG-RAN and/or E-UTRAN) may be classified into a first layer (L1), a second layer (L2), and a third layer (L3) based on the lower three layers of the open system interconnection (OSI) model that is well-known in the communication system.

Figure 3:
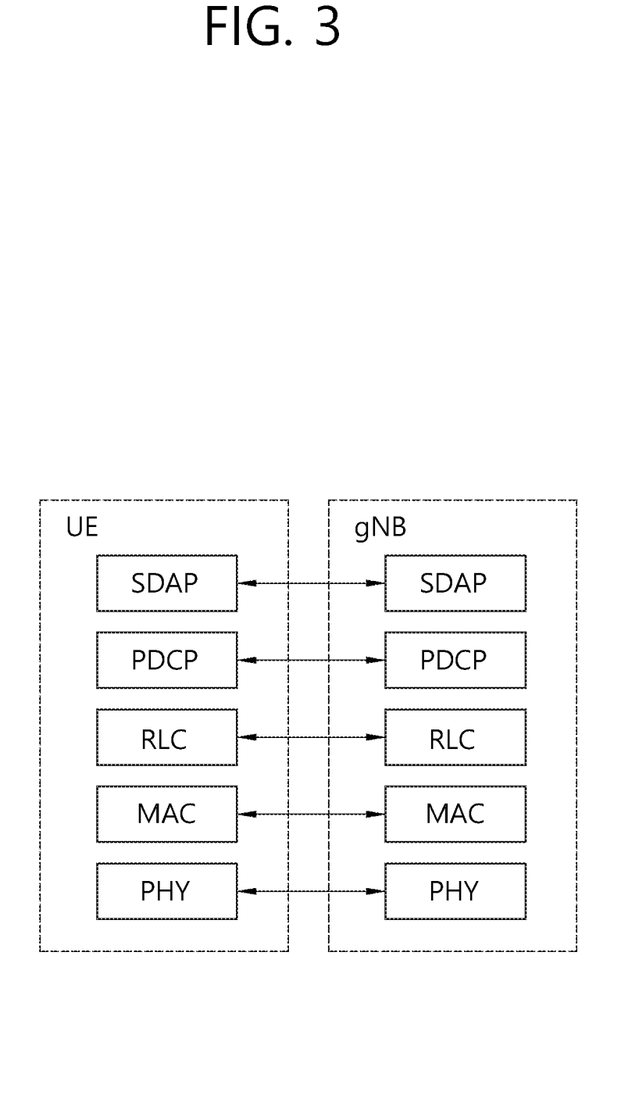
FIG. 3 shows a block diagram of a user plane protocol stack to which technical features of the present invention can be applied.
Figure 4:
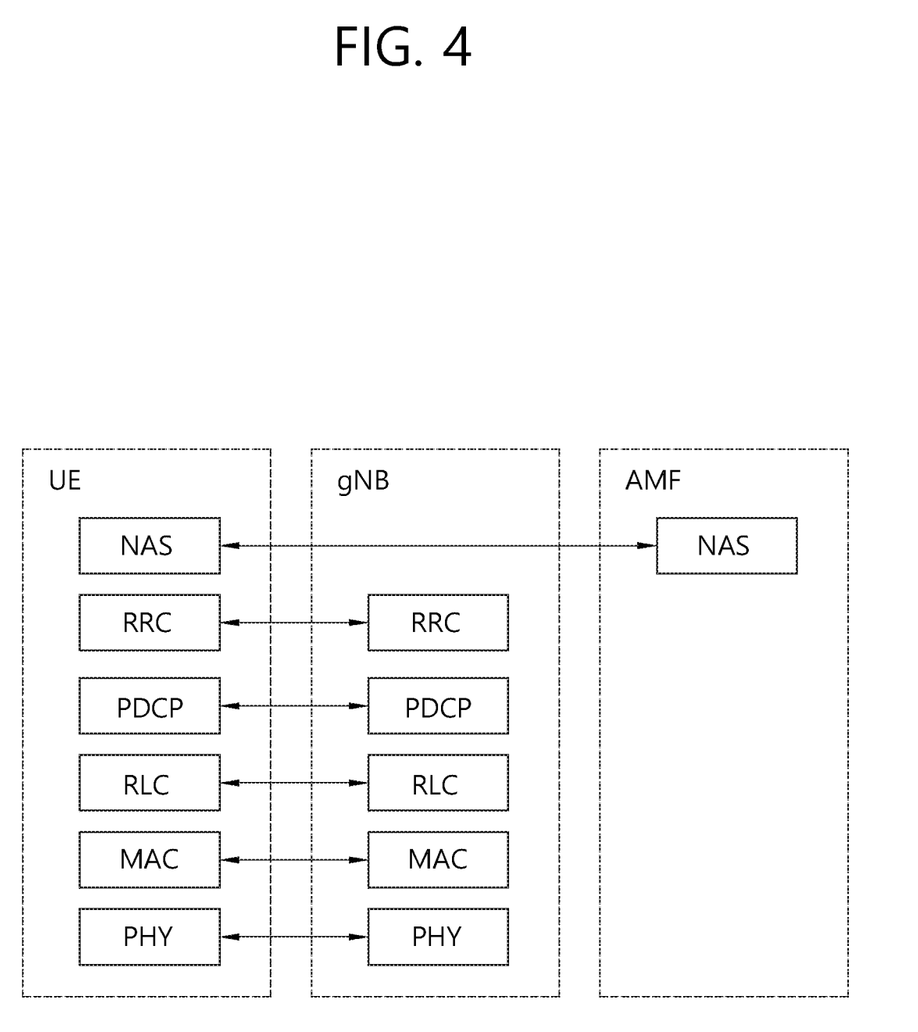
FIG. 4 shows a block diagram of a control plane protocol stack to which technical features of the present invention can be applied.

FIG. 3 shows a block diagram of a user plane protocol stack to which technical features of the present invention can be applied. FIG. 4 shows a block diagram of a control plane protocol stack to which technical features of the present invention can be applied. The user/control plane protocol stacks shown in FIG. 3 and FIG. 4 are used in NR. However, user/control plane protocol stacks shown in FIG. 3 and FIG. 4 may be used in LTE/LTE-A without loss of generality, by replacing gNB/AMF with eNB/MME.

Referring to FIG. 3 and FIG. 4, a physical (PHY) layer belonging to L1. The PHY layer offers information transfer services to media access control (MAC) sublayer and higher layers. The PHY layer offers to the MAC sublayer transport channels. Data between the MAC sublayer and the PHY layer is transferred via the transport channels. Between different PHY layers, i.e., between a PHY layer of a transmission side and a PHY layer of a reception side, data is transferred via the physical channels.

The MAC sublayer belongs to L2. The main services and functions of the MAC sublayer include mapping between logical channels and transport channels, multiplexing/de-multiplexing of MAC service data units (SDUs) belonging to one or different logical channels into/from transport blocks (TB) delivered to/from the physical layer on transport channels, scheduling information reporting, error correction through hybrid automatic repeat request (HARQ), priority handling between UEs by means of dynamic scheduling, priority handling between logical channels of one UE by means of logical channel prioritization (LCP), etc. The MAC sublayer offers to the radio link control (RLC) sublayer logical channels.

The RLC sublayer belong to L2. The RLC sublayer supports three transmission modes, i.e. transparent mode (TM), unacknowledged mode (UM), and acknowledged mode (AM), in order to guarantee various quality of services (QoS) required by radio bearers. The main services and functions of the RLC sublayer depend on the transmission mode. For example, the RLC sublayer provides transfer of upper layer PDUs for all three modes, but provides error correction through ARQ for AM only. In LTE/LTE-A, the RLC sublayer provides concatenation, segmentation and reassembly of RLC SDUs (only for UM and AM data transfer) and re-segmentation of RLC data PDUs (only for AM data transfer). In NR, the RLC sublayer provides segmentation (only for AM and UM) and re-segmentation (only for AM) of RLC SDUs and reassembly of SDU (only for AM and UM). That is, the NR does not support concatenation of RLC SDUs. The RLC sublayer offers to the packet data convergence protocol (PDCP) sublayer RLC channels.

The PDCP sublayer belong to L2. The main services and functions of the PDCP sublayer for the user plane include header compression and decompression, transfer of user data, duplicate detection, PDCP PDU routing, retransmission of PDCP SDUs, ciphering and deciphering, etc. The main services and functions of the PDCP sublayer for the control plane include ciphering and integrity protection, transfer of control plane data, etc.

The service data adaptation protocol (SDAP) sublayer belong to L2. The SDAP sublayer is only defined in the user plane. The SDAP sublayer is only defined for NR. The main services and functions of SDAP include, mapping between a QoS flow and a data radio bearer (DRB), and marking QoS flow ID (QFI) in both DL and UL packets. The SDAP sublayer offers to 5GC QoS flows.

A radio resource control (RRC) layer belongs to L3. The RRC layer is only defined in the control plane. The RRC layer controls radio resources between the UE and the network. To this end, the RRC layer exchanges RRC messages between the UE and the BS. The main services and functions of the RRC layer include broadcast of system information related to AS and NAS, paging, establishment, maintenance and release of an RRC connection between the UE and the network, security functions including key management, establishment, configuration, maintenance and release of radio bearers, mobility functions, QoS management functions, UE measurement reporting and control of the reporting, NAS message transfer to/from NAS from/to UE.

In other words, the RRC layer controls logical channels, transport channels, and physical channels in relation to the configuration, reconfiguration, and release of radio bearers. A radio bearer refers to a logical path provided by L1 (PHY layer) and L2 (MAC/RLC/PDCP/SDAP sublayer) for data transmission between a UE and a network. Setting the radio bearer means defining the characteristics of the radio protocol layer and the channel for providing a specific service, and setting each specific parameter and operation method. Radio bearer may be divided into signaling RB (SRB) and data RB (DRB). The SRB is used as a path for transmitting RRC messages in the control plane, and the DRB is used as a path for transmitting user data in the user plane.

An RRC state indicates whether an RRC layer of the UE is logically connected to an RRC layer of the E-UTRAN. In LTE/LTE-A, when the RRC connection is established between the RRC layer of the UE and the RRC layer of the E-UTRAN, the UE is in the RRC connected state (RRC_CONNECTED). Otherwise, the UE is in the RRC idle state (RRC_IDLE). In NR, the RRC inactive state (RRC_INACTIVE) is additionally introduced. RRC_INACTIVE may be used for various purposes. For example, the massive machine type communications (MMTC) UEs can be efficiently managed in RRC_INACTIVE. When a specific condition is satisfied, transition is made from one of the above three states to the other.

A predetermined operation may be performed according to the RRC state. In RRC_IDLE, public land mobile network (PLMN) selection, broadcast of system information (SI), cell re-selection mobility, core network (CN) paging and discontinuous reception (DRX) configured by NAS may be performed. The UE shall have been allocated an identifier (ID) which uniquely identifies the UE in a tracking area. No RRC context stored in the base station.

In RRC_CONNECTED, the UE has an RRC connection with the network (i.e. E-UTRAN/NG-RAN). Network-CN connection (both C/U-planes) is also established for UE. The UE AS context is stored in the network and the UE. The RAN knows the cell which the UE belongs to. The network can transmit and/or receive data to/from UE. Network controlled mobility including measurement is also performed.

Most of operations performed in RRC_IDLE may be performed in RRC_INACTIVE. But, instead of CN paging in RRC_IDLE, RAN paging is performed in RRC_INACTIVE. In other words, in RRC_IDLE, paging for mobile terminated (MT) data is initiated by core network and paging area is managed by core network. In RRC_INACTIVE, paging is initiated by NG-RAN, and RAN-based notification area (RNA) is managed by NG-RAN. Further, instead of DRX for CN paging configured by NAS in RRC_IDLE, DRX for RAN paging is configured by NG-RAN in RRC_INACTIVE. Meanwhile, in RRC_INACTIVE, 5GC-NG-RAN connection (both C/U-planes) is established for UE, and the UE AS context is stored in NG-RAN and the UE. NG-RAN knows the RNA which the UE belongs to.

NAS layer is located at the top of the RRC layer. The NAS control protocol performs the functions, such as authentication, mobility management, security control.

The physical channels may be modulated according to OFDM processing and utilizes time and frequency as radio resources. The physical channels consist of a plurality of orthogonal frequency division multiplexing (OFDM) symbols in time domain and a plurality of subcarriers in frequency domain. One subframe consists of a plurality of OFDM symbols in the time domain. A resource block is a resource allocation unit, and consists of a plurality of OFDM symbols and a plurality of subcarriers. In addition, each subframe may use specific subcarriers of specific OFDM symbols (e.g. first OFDM symbol) of the corresponding subframe for a physical downlink control channel (PDCCH), i.e. L1/L2 control channel. A transmission time interval (TTI) is a basic unit of time used by a scheduler for resource allocation. The TTI may be defined in units of one or a plurality of slots, or may be defined in units of mini-slots.

The transport channels are classified according to how and with what characteristics data are transferred over the radio interface. DL transport channels include a broadcast channel (BCH) used for transmitting system information, a downlink shared channel (DL-SCH) used for transmitting user traffic or control signals, and a paging channel (PCH) used for paging a UE. UL transport channels include an uplink shared channel (UL-SCH) for transmitting user traffic or control signals and a random access channel (RACH) normally used for initial access to a cell.

Different kinds of data transfer services are offered by MAC sublayer. Each logical channel type is defined by what type of information is transferred. Logical channels are classified into two groups: control channels and traffic channels.

Control channels are used for the transfer of control plane information only. The control channels include a broadcast control channel (BCCH), a paging control channel (PCCH), a common control channel (CCCH) and a dedicated control channel (DCCH). The BCCH is a DL channel for broadcasting system control information. The PCCH is DL channel that transfers paging information, system information change notifications. The CCCH is a channel for transmitting control information between UEs and network. This channel is used for UEs having no RRC connection with the network. The DCCH is a point-to-point bi-directional channel that transmits dedicated control information between a UE and the network. This channel is used by UEs having an RRC connection.

Traffic channels are used for the transfer of user plane information only. The traffic channels include a dedicated traffic channel (DTCH). The DTCH is a point-to-point channel, dedicated to one UE, for the transfer of user information. The DTCH can exist in both UL and DL.

Regarding mapping between the logical channels and transport channels, in DL, BCCH can be mapped to BCH, BCCH can be mapped to DL-SCH, PCCH can be mapped to PCH, CCCH can be mapped to DL-SCH, DCCH can be mapped to DL-SCH, and DTCH can be mapped to DL-SCH. In UL, CCCH can be mapped to UL-SCH, DCCH can be mapped to UL-SCH, and DTCH can be mapped to UL-SCH.

Hereinafter, RRM measurements in NR are described.

The baseline of the RRM measurement framework for DL is the one specified for LTE (measurement object, measurement ID, reporting configuration). The DL RRM measurement should be performed based on a common framework regardless of network and UE beam configurations (e.g. number of beams). As for the event triggered reporting, Event A1 to A6 like the ones specified for LTE are at least to be supported with potential modifications. Other events may also be studied for NR. Measurement report contains at least cell level measurement results.

A UE in RRC_CONNECTED should be able to perform RRM measurements on always on idle RS (e.g. NR-PSS/SSS) and/or CSI-RS. The gNB should be able to configure RRM measurements via dedicated signalling to be performed on CSI-RS and/or idle RS. The event triggered reporting can be configured for NR-PSS/SSS and for CSI-RS for RRM measurements. At least, Even A1 to A6 can be configured for NR-PSS/SSS.

In the multi-beam operation, the UE in RRC_CONNECTED measures at least one or more individual DL beams. The gNB should have the mechanisms to consider the measurement results of those DL beams for handover. This mechanism is needed at least to trigger inter-gNB handover and to optimise handover ping-pong and failure. The UE should be able to distinguish between the beams from its serving cell and the beams from neighbour cells. The UE should be able to learn if a beam is coming from its serving cell. Cell level signalling quality for the DL RRM measurement can be derived from N best beams, if detected, where the value of N can be configured to 1 or more than 1. This does not preclude the DL RRM measurement on a single beam. Measurement report may contain the measurement results of the N best beams if the UE is configured to do so by the gNB.

Meanwhile, layer 3 filtering is performed for measurement results. The layer 3 filtering applies a rolling average to the measurements, to ensure that a single, unusually high or low measurement doesn't trigger an undesired action.

The UE may perform layer 3 filtering as follow.

The UE shall:

1> for each measurement quantity that the UE performs measurements:

2> filter the measured result, before using for evaluation of reporting criteria or for measurement reporting, by the following formula:

$$F_n = (1-a) \cdot F_{n-1} + a \cdot M_n$$

Mn is the latest received measurement result from the physical layer. Fn is the updated filtered measurement result, that is used for evaluation of reporting criteria or for measurement reporting. Fn−1 is the old filtered measurement result, where $F_0$ is set to $M_1$ when the first measurement result from the physical layer is received. $a=\frac{1}{2}^{(k/4)}$, where k is the filterCoefficient for the corresponding measurement quantity received by the quantityConfig;

2> adapt the filter such that the time characteristics of the filter are preserved at different input rates, observing that the filterCoefficient k assumes a sample rate equal to 200 ms;

If k is set to 0, no layer 3 filtering is applicable. The filtering is performed in the same domain as used for evaluation of reporting criteria or for measurement reporting, i.e., logarithmic filtering for logarithmic measurements. The filter input rate is implementation dependent, to fulfil the performance requirements set.

Hereinafter, a method for performing measurement according to an embodiment of the present invention is described. In NR, Reference Signal (=RS) periodicity can be quite varied as opposed to LTE. If RS periodicity varies, filter coefficients are needed to be varied. Thus, it is desirable to configure different filter coefficient depending on the RS periodicity. Specifically, the UE may configure small filter coefficient for longer periodicity.

Figure 5:
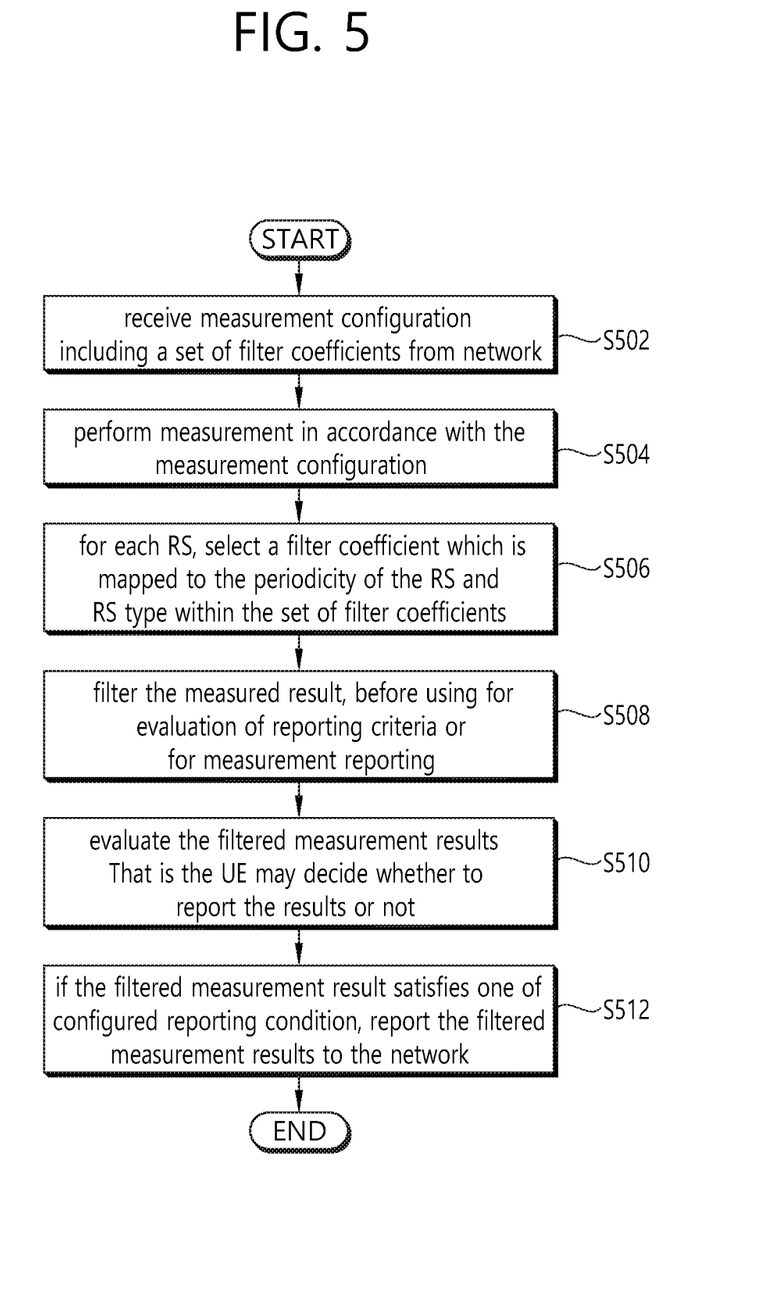
FIG. 5 shows an example of a method for performing measurement according to an embodiment of the present invention.

FIG. 5 shows a method for performing measurement according to the present invention. According to an embodiment of the present invention, when the UE filters the measured result, the UE may select and apply a filter coefficient associated with concerned reference signal periodicity.

In step S502, the UE may receive measurement configuration including a set of filter coefficients from network. There may be a single filter coefficient per RS periodicity. Though the periodicity is the same, different filter coefficient may be assigned for different RS type, i.e. SS-block or CSI-RS. That is, the set of filter coefficient may include filter coefficients which are mapped to each RS periodicity and/or RS type.

Table 1 shows an example of a set of filter coefficient for cell quality (RSRP).

TABLE 1

| SS-block periodicity (ms) | Filter coefficient | CSI-RS periodicity (ms) | Filter coefficient |
|---|---|---|---|
| 40 | 1 | 40 | 2 |
| 80 | 5 | 80 | 7 |
| 160 | 11 | 160 | 13 |

The set of filter coefficients can be provided per measurement quantity, i.e. RSRP, RSRQ and/or SINR, per RS type, i.e. SS-block and/or CSI-RS. Different set of filter coefficients can be provided for cell quality and beam quality.

In step S504, the UE may perform measurement in accordance with the measurement configuration.

In step S506, for each RS that the UE performs measurements, UE may select a filter coefficient which is mapped to the periodicity of the RS and/or RS type within the set of filter coefficients.

In step S508, the UE may filter the measured result, before using for evaluation of reporting criteria or for measurement reporting, by the following equation 1.

$$F_n=(1-a)\cdot F_{n-1}+a\cdot M_n \quad \text{[Equation 1]}$$

In equation 1, Mn is the latest received measurement result from the physical layer. Fn is the updated filtered measurement result, that is used for evaluation of reporting criteria or for measurement reporting. Fn−1 is the old filtered measurement result, where F0 is set to $M_1$ when the first measurement result from the physical layer is received. a=½(k/4), where k is the selected filterCoefficient in step S506 for the corresponding measurement quantity received by the quantityConfig.

For example, the UE may measure NR frequency A, B and C. The CSI-RS periodicity of NR frequency A, B and C are 40, 80 and 160, respectively. Referring to table 1, the UE may perform L3 filtering for the measurement result of frequency A using filter coefficient 2. Also, the UE may perform L3 filtering the measurement result of frequency B using filter coefficient 7. Also, the UE may perform L3 filtering the measurement result of frequency C using filter coefficient 13.

In step S510, the UE may evaluate the filtered measurement results. That is the UE may decide whether to report the results or not.

In step S512, if the filtered measurement result satisfies one of configured reporting condition, the UE may report the filtered measurement results to the network.

According to embodiments of the present invention, the UE may flexibly adjust filter coefficient based on the periodicity of RS and the type of the RS, by selecting filter coefficient in a set of filter coefficient received from the network.

Figure 6:
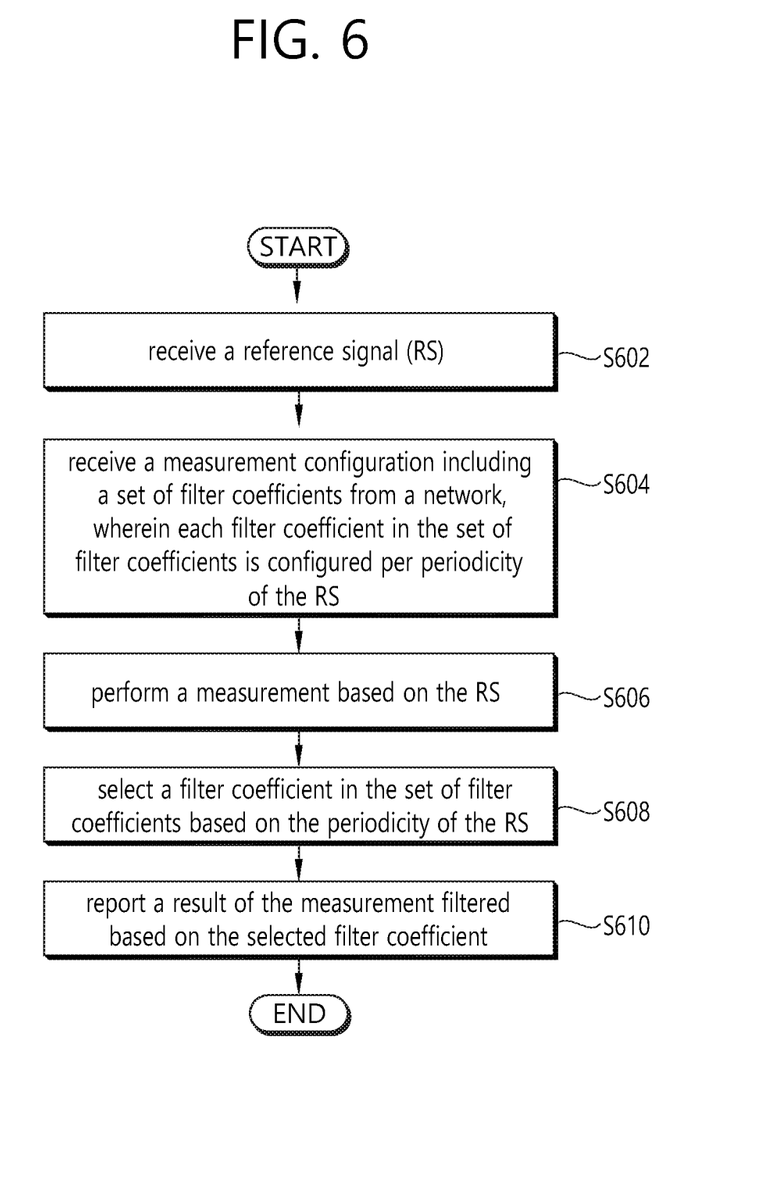
FIG. 6 shows an example of a method for performing measurement according to an embodiment of the present invention.

FIG. 6 shows a method for performing measurement according to the present invention.

In step S602, the UE may receive a reference signal (RS).

In step S604, the UE may receive a measurement configuration including a set of filter coefficients from a network, wherein each filter coefficient in the set of filter coefficients is configured per periodicity of the RS. The filter coefficient may be further configured per a type of the RS in the set of the filter coefficients. The type of the RS may be at least one of synchronization signal (SS)-block or channel state information (CSI)-RS. The set of the filter coefficients may be configured per cell quality.

In step S606, the UE may performing a measurement based on the RS.

In step S608, the UE may select a filter coefficient in the set of filter coefficients based on the periodicity of the RS. The UE may the select the filter coefficient based on the type of the RS.

In step S610, the UE may report a result of the measurement filtered based on the selected filter coefficient. The filtering the result of the measurement may be filtering on radio interface layer 3 of the UE Further, the UE may report the filtered result of the measurement, if the filtered result satisfies a reporting condition.

According to embodiments of the present invention, the UE may flexibly adjust filter coefficient based on the periodicity of RS and the type of the RS, by selecting filter coefficient in a set of filter coefficient received from the network.

Figure 7:
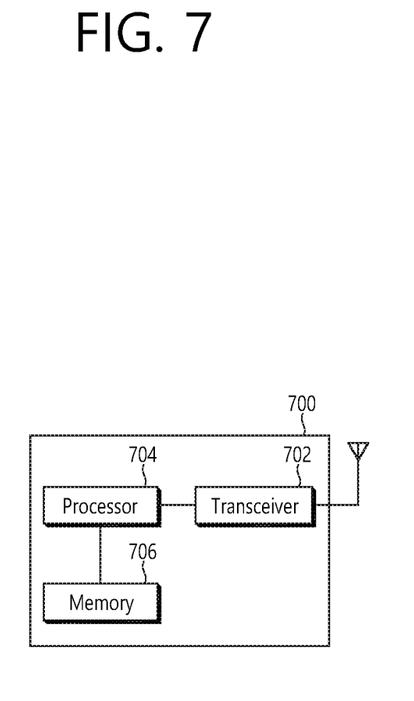
FIG. 7 shows a structure of UE according to an embodiment of the present invention.

FIG. 7 shows a structure of UE according to an embodiment of the present invention.

According to an embodiment of the present invention, the UE 700 may comprise transceiver 702, processor 704 and memory 706. The memory 706 is coupled to the processor 804, and stores a variety of information for driving the processor 704. The transceiver 702 is coupled to the processor 704, and transmits and/or receives a radio signal. The processor 704 implements the proposed functions, procedures, and/or methods. In the aforementioned embodiments, an operation of the UE 700 may be implemented by the processor 704.

The processor 704 may include application-specific integrated circuit (ASIC), other chipset, logic circuit and/or data processing device. The memory 706 may include read-only memory (ROM), random access memory (RAM), flash memory, memory card, storage medium and/or other storage device. The transceiver 702 may include baseband circuitry to process radio frequency signals. When the embodiments are implemented in software, the techniques described herein can be implemented with modules (e.g., procedures, functions, and so on) that perform the functions described herein. The modules can be stored in memories and executed by processor 704. The memory 706 can be implemented within the processor 704 or external to the processor 704 in which case those can be communicatively coupled to the processor 704 via various means as is known in the art.

The processor 704 may be configured to control transceiver 702 to receive a reference signal (RS).

The processor 704 may be configured to control transceiver 702 to receive a measurement configuration including a set of filter coefficients from a network, wherein each of the filter coefficient is configured per periodicity of the RS. The filter coefficient may be further configured per a type of the RS in the set of the filter coefficients. The type of the RS may be at least one of synchronization signal (SS)-block or channel state information (CSI)-RS. The set of the filter coefficients may be configured per cell quality. Further, the processor 704 may be configured to control the transceiver 702 to report the filtered result of the measurement, if the filtered result satisfies a reporting condition.

The processor 704 may be configured to perform a measurement by using the RS. The processor 704 may be configured to select a filter coefficient in the set of filter coefficients based on the periodicity of the RS. The processor 704 may be configured to filter a result of the measurement based on the selected filter coefficient. The filtering the result of the measurement may be filtering on radio interface layer 3 of the UE.

According to embodiments of the present invention, the UE may flexibly adjust filter coefficient based on the periodicity of RS and the type of the RS, by selecting filter coefficient in a set of filter coefficient received from the network.

Figure 8:
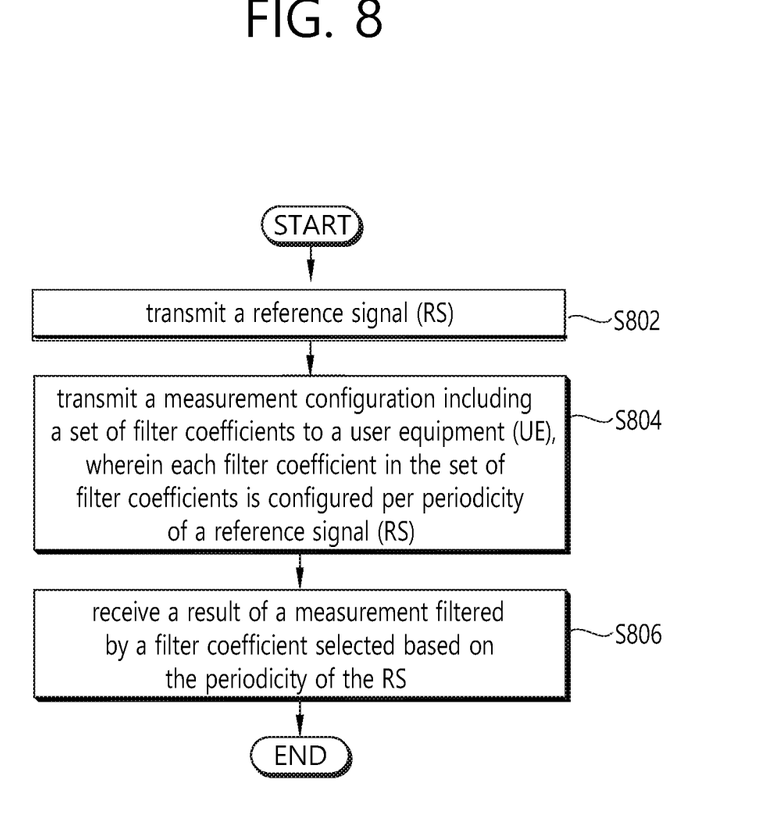
FIG. 8 shows an example of a method for performing measurement according to an embodiment of the present invention.

FIG. 8 shows a method for performing measurement according to the present invention. In this embodiment, the base station (BS) may be at least one of eNB or gNB, and also may be referred as network.

In step S802, the BS may be configured to transmit a reference signal (RS).

In step S804, the BS may be configured to transmit a measurement configuration including a set of filter coefficients to a user equipment (UE), wherein each filter coefficient in the set of filter coefficients is configured per periodicity of a reference signal (RS). The filter coefficient may be further configured per a type of the RS in the set of the filter coefficients. The type of the RS may be at least one of synchronization signal (SS)-block or channel state information (CSI)-RS. The set of the filter coefficients may be configured per cell quality.

In step S806, the BS may be configured to receive a result of a measurement filtered by a filter coefficient selected based on the periodicity of the RS. The filtering the result of the measurement may be filtering on radio interface layer 3 of the UE.

According to embodiments of the present invention, the UE may flexibly adjust filter coefficient based on the periodicity of RS and the type of the RS, by selecting filter coefficient in a set of filter coefficient received from the network.

Figure 9:
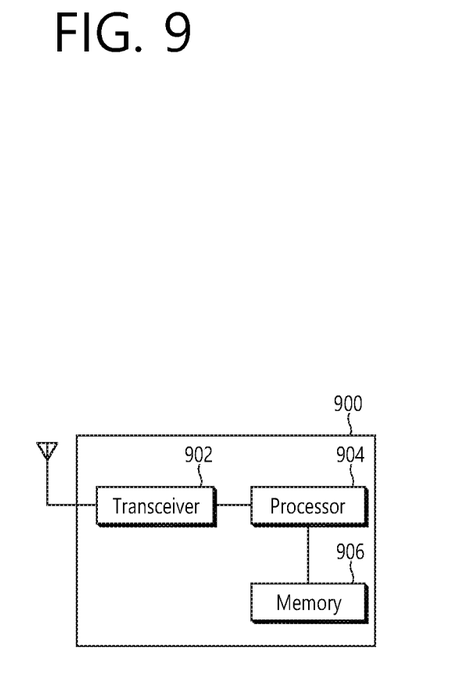
FIG. 9 shows a structure of network according to an embodiment of the present invention.

FIG. 9 shows a structure of network according to an embodiment of the present invention. In this embodiment, the base station (BS) 900 may be at least one of eNB or gNB.

According to an embodiment of the present invention, the BS 900 may comprise transceiver 902, processor 904 and memory 906. The memory 906 is coupled to the processor 904, and stores a variety of information for driving the processor 904. The transceiver 902 is coupled to the processor 904, and transmits and/or receives a radio signal. The processor 904 implements the proposed functions, procedures, and/or methods. In the aforementioned embodiments, an operation of the BS 900 may be implemented by the processor 904.

The processor 904 may include application-specific integrated circuit (ASIC), other chipset, logic circuit and/or data processing device. The memory 906 may include read-only memory (ROM), random access memory (RAM), flash memory, memory card, storage medium and/or other storage device. The transceiver 902 may include baseband circuitry to process radio frequency signals. When the embodiments are implemented in software, the techniques described herein can be implemented with modules (e.g., procedures, functions, and so on) that perform the functions described herein. The modules can be stored in memory 906 and executed by processor 904. The memory 906 can be implemented within the processor 904 or external to the processor 904 in which case those can be communicatively coupled to the processor 904 via various means as is known in the art.

The processor 904 may be configured to control the transceiver 902 to transmit a reference signal (RS).

The processor 904 may be configured to control the transceiver 902 to transmit a measurement configuration including a set of filter coefficients to a user equipment (UE), wherein each filter coefficient in the set of filter coefficients is configured per periodicity of a reference signal (RS). The filter coefficient may be further configured per a type of the RS in the set of the filter coefficients. The type of the RS may be at least one of synchronization signal (SS)-block or channel state information (CSI)-RS. The set of the filter coefficients may be configured per cell quality.

The processor 904 may be configured to control the transceiver 902 to receive a result of a measurement filtered by a filter coefficient selected based on the periodicity of the RS. The filtering the result of the measurement may be filtering on radio interface layer 3 of the UE.

According to embodiments of the present invention, the UE may flexibly adjust filter coefficient based on the periodicity of RS and the type of the RS, by selecting filter coefficient in a set of filter coefficient received from the network.

In view of the exemplary systems described herein, methodologies that may be implemented in accordance with the disclosed subject matter have been described with reference to several flow diagrams. While for purposed of simplicity, the methodologies are shown and described as a series of steps or blocks, it is to be understood and appreciated that the claimed subject matter is not limited by the order of the steps or blocks, as some steps may occur in different orders or concurrently with other steps from what is depicted and described herein. Moreover, one skilled in the art would understand that the steps illustrated in the flow diagram are not exclusive and other steps may be included or one or more of the steps in the example flow diagram may be deleted without affecting the scope and spirit of the present disclosure.

What has been described above includes examples of the various aspects. It is, of course, not possible to describe every conceivable combination of components or methodologies for purposes of describing the various aspects, but one of ordinary skill in the art may recognize that many further combinations and permutations are possible. Accordingly, the subject specification is intended to embrace all such alternations, modifications and variations that fall within the scope of the appended claims.

What is claimed is:

1. A method for a user equipment (UE) in wireless communication system, the method comprising:
 receiving a reference signal (RS) based on a periodicity of the RS;
 receiving, from a network, a measurement configuration including a set of filter coefficients for layer 3 (L3) filtering;

performing a measurement for the RS based on the measurement configuration to obtain a result of the measurement;

identifying a filter coefficient for the L3 filtering in the set of filter coefficients, the filter coefficient being mapped to a combination of the periodicity of the RS and a type of the RS, wherein the type of the RS represents whether the RS is a synchronization signal (SS) block or a channel state information-reference signal (CSI-RS);

applying the filter coefficient for the L3 filtering to the result of the measurement; and transmitting, to the network, a measurement report comprising the result of the measurement to which the filter coefficient is applied, wherein different filter coefficients in the set of filter coefficients are mapped to different combinations of the periodicity of the RS and the type of the RS.

2. The method of claim 1, wherein the set of filter coefficients is configured per cell quality.

3. The method of claim 1, wherein transmitting the measurement report comprises transmitting the measurement report comprising the result of the measurement based on a determination that the result of the measurement satisfies a reporting condition.

4. The method of claim 1, wherein applying the filter coefficient for the L3 filtering comprises performing a L3 filtering on the result of the measurement.

5. The method of claim 1, wherein the filter coefficient increases as the periodicity of the RS increases.

6. A wireless device in a wireless communication system, the wireless device comprising:
   a transceiver;
   a memory; and
   at least one processor operatively coupled to the transceiver and the memory,
   wherein the at least one processor is configured to:
   control the transceiver to receive a reference signal (RS) based on a periodicity of the RS;
   control the transceiver to receive, from a network, a measurement configuration including a set of filter coefficients for layer 3 (L3) filtering;
   perform a measurement for the RS based on the measurement configuration to obtain a result of the measurement;
   identify a filter coefficient for the L3 filtering in the set of filter coefficients, the filter coefficient being mapped to a combination of the periodicity of the RS and a type of the RS,
   wherein the type of the RS represents whether the RS is a synchronization signal (SS) block or a channel state information-reference signal (CSI-RS);
   apply the filter coefficient for the L3 filtering to the result of the measurement; and
   control the transceiver to transmit, to the network, a measurement report comprising the result of the measurement to which the filter coefficient is applied,
   wherein different filter coefficients in the set of filter coefficients are mapped to different combinations of the periodicity of the RS and the type of the RS.

7. The wireless device of claim 6, wherein the set of filter coefficients is configured per cell quality.

8. The wireless device of claim 6, wherein the at least one processor is further configured to:
   control the transceiver to transmit the measurement report comprising the result of the measurement based on a determination that the result of the measurement satisfies a reporting condition.

9. The wireless device of claim 6, wherein the at least one processor is further configured to perform a L3 filtering on the result of the measurement.

10. The wireless device of claim 6, wherein the filter coefficient increases as the periodicity of the RS increases.

* * * * *